Figures 8, 9:
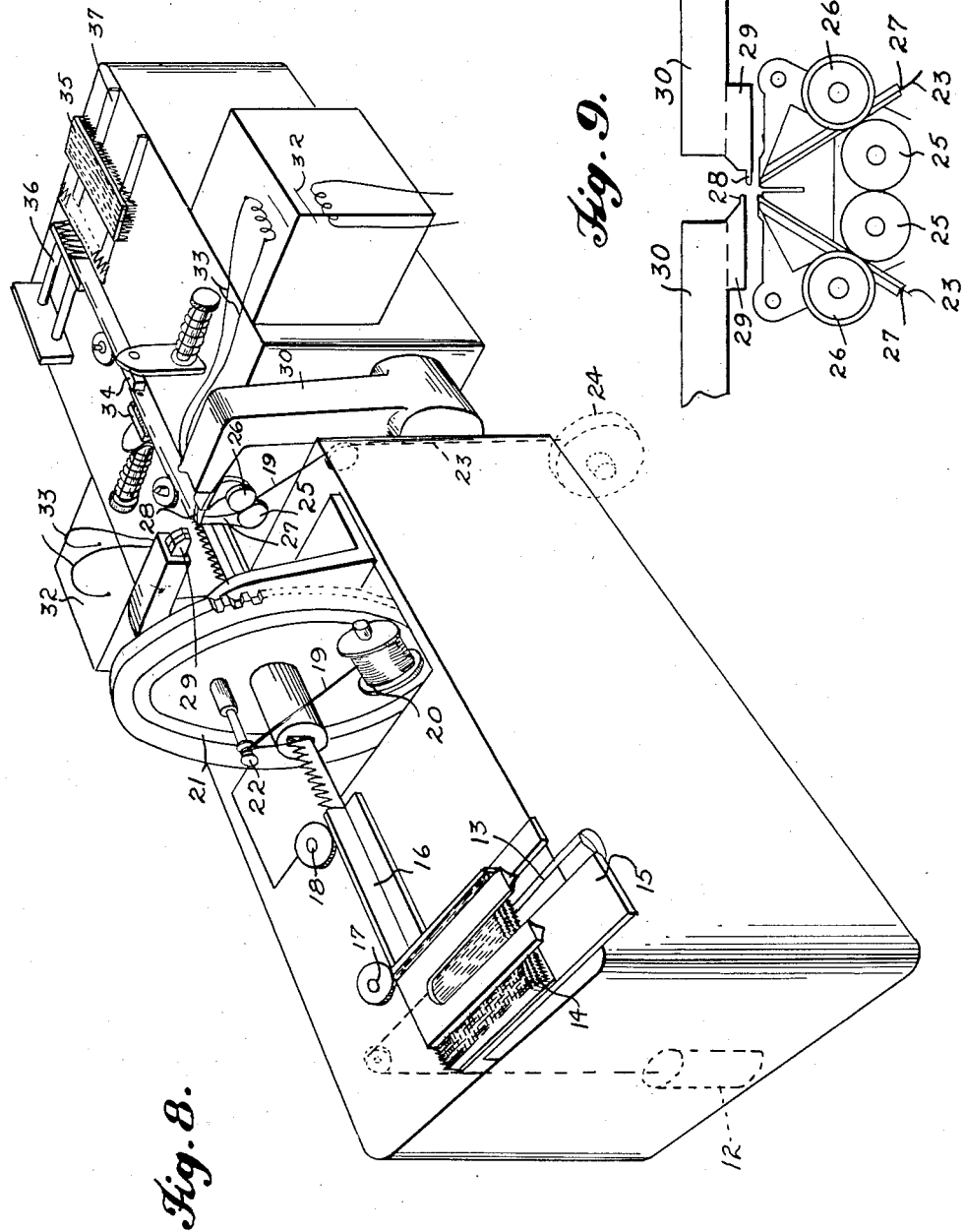

May 5, 1959  I. C. McLEAN BELL  2,885,530
SOLDERING
Filed Dec. 10, 1956  2 Sheets-Sheet 1
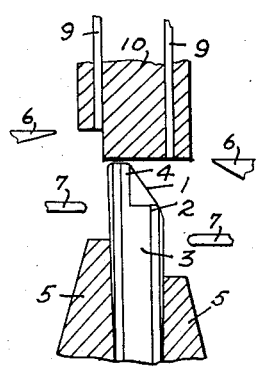
Fig. 1.
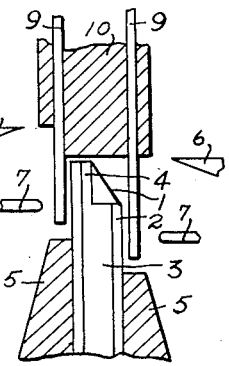
Fig. 2.
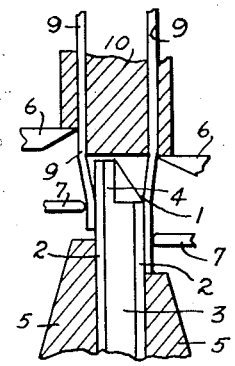
Fig. 3.
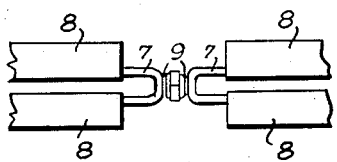
Fig. 4.
Fig. 5.
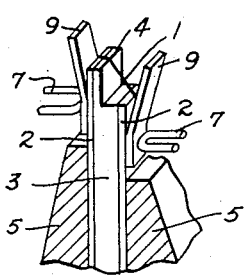
Fig. 6.
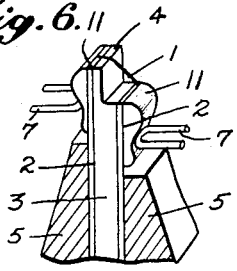
Fig. 7.
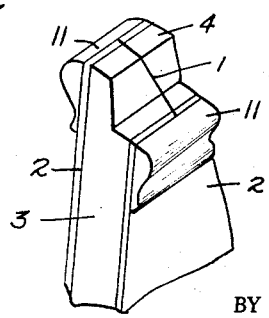
INVENTOR
IAN CHARLES McLEAN BELL
BY Cushman, Darby & Cushman
ATTORNEYS May 5, 1959  I. C. McLEAN BELL  2,885,530
SOLDERING Filed Dec. 10, 1956  2 Sheets-Sheet 2

INVENTOR
IAN CHARLES McLEAN BELL

BY Cushman, Darby & Cushman
ATTORNEYS

United States Patent Office 2,885,530
Patented May 5, 1959

2,885,530

SOLDERING

Ian Charles McLean Bell, Glasgow, Scotland, assignor to Imperial Chemical Industries Limited, London, England, a corporation of Great Britain Application December 10, 1956, Serial No. 627,255

Claims priority, application Great Britain January 18, 1956

5 Claims. (Cl. 219—85)

This invention relates to a process of soldering thin wire to a metal sheet and more particularly in the production of low tension electric fuseheads for electric detonators to the step of soldering of resistance bridge wire at the end of each successive tooth having two metal foil pole pieces between which is sandwiched a strip of non-conducting material of a comb produced by cutting an assembly formed by cementing two rectangular metallic sheets one on each side of a sheet of non-conducting material.

At the ends of the teeth prior to the application of the resistance bridge wire the metal foil pole pieces and part of the thickness of the non-conducting material such as cardboard may be removed at one side to accommodate the required length of wire between the two metal foil pole pieces.

Heretofore the operation of soldering said bridge wire at the end of each successive tooth to its two metal foil pole pieces has been performed manually by ordinary soldering technique with a conventional electrically heated copper soldering bolt. Such a soldering operation however cannot readily be mechanised due for example to the unavoidable progressive decay of the soldering bolt and to the difficulty of producing mechanically regular joints of a desirable shape so that the resistance of the bridge wire is always between specified limits.

According to the present invention the method of soldering a thin wire positioned against a substantially vertical metal sheet comprises pressing a portion of solder against said thin wire by an electrical conducting wire of material to which molten solder does not adhere and of a length at least sufficient to permit a portion thereof to have a shape which conforms substantially to the configuration of said sheet in a horizontal plane and in the neighbourhood thereof to which said thin wire is to be soldered and at least of such a length that when in a substantially horizontal plane and against said sheet the molten solder which is being formed by the melting of the solder above it during the passage of a current through it is prevented by it from flowing below it and passing an electric current through said electrically conducting wire of such strength and duration so as to solder the thin wire against said metal sheet.

In accordance with one embodiment of the method of the invention which permits forming in a continuous manner a soldered bridge wire at the end of each successive tooth having two metal foil pole pieces between which is sandwiched a strip of non-conducting material of a comb produced by cutting an assembly formed by cementing two rectangular metallic sheets one on each side of a sheet of non-conducting material and wherein each tooth is wound with an electric resistance wire comprises retaining in position at each side of said tooth a portion of solder and bringing to each side of said tooth into contact with the solder an electrical conducting wire of material to which molten solder does not adhere and of a length at least sufficient to permit a portion thereof to have a shape which conforms substantially to the configuration in a horizontal plane of the metal foil pole piece to which it is to be applied and in the neighbourhood to which the end of the electric resistance wire is to be soldered and at least such a length that when in a substantially horizontal plane and against the metal foil pole piece molten solder which is being formed by the melting of the solder above it during the passage of a current through it is prevented by it from flowing below it, arranging that each portion of solder is of such volume and each electrically conducting wire is so positioned that no solder forms on the bridge formed by the electric resistance wire and that there is no free resistance wire on either side of this bridge and passing an electric current through each electrically conducting wire of such strength and duration as to solder the electric resistance wire to each metal foil pole piece.

Said conducting wire of material to which molten solder does not adhere is preferably of tungsten but such wire can also be of aluminium or aluminised copper. The length of tungsten wire which is brought into contact with the solder for the purpose of soldering the bridge wire to each metal foil pole piece of each successive tooth of a comb as aforesaid is preferably 4 mm. and the total length of such a wire is preferably 14 mm. to permit an arm of 5 mm. length to be provided at right angles at each end of the wire of 4 mm. The tungsten wire is also preferably 22 S.W.G.

The duration of the electric current may be for instance 0.2 second and the period of time before the wire is removed to permit re-solidification of the solder may be for instance 0.5 second. The electric current should preferably be of such strength as to raise the mean temperature of the solder to about 250° C.

The solder is preferably flux cored of 22 S.W.G. flattened to a thickness of 0.008 inch.

The strips of solder may be delivered vertically downwards or vertically upwards and preferably intermittently and it is preferred to cut off such a portion of the solder before passing the electric current through the electrical conducting wire of material to which molten solder does not adhere after pressing said electrical conducting wire against the solder that the shape and volume of the solder on its re-solidification will be such that no solder forms on the bridge formed by the resistance wire and that there is no free resistance wire on either side of this bridge.

In an electrical soldering apparatus according to the invention particularly adapted to solder a thin wire positioned against a substantially vertical metal sheet a soldering bit comprising an electrically conducting wire of material to which molten solder does not adhere and of a length at least sufficient to permit a portion thereof to have a shape which conforms substantially to the configuration of said sheet in a horizontal plane and in the neighbourhood thereof to which said thin wire is to be soldered and at least such a length that when in a substantially horizontal plane and against said sheet molten solder which is being formed by the melting of a strip of solder above it during the passage of a current through it is prevented by it from flowing below it.

Electrical soldering apparatus in accordance with one embodiment of the apparatus of the invention particularly adapted to solder a thin wire positioned against a vertical metal sheet comprises a holder for said sheet and means adapted to operate a mechanical device carrying a pair of electrodes the free ends of which are substantially in the same horizontal plane and which are connected at their free ends by an electrical conducting wire of material to which molten solder does not adhere and of a length at least sufficient to permit a portion thereof to have a shape which conforms substantially to the configuration of said sheet in a horizontal plane and in the neighbourhood to which said thin wire is to be soldered and at least such a length that when in a substantially horizontal plane and against said sheet the free ends of said electrodes are not in contact with said vertical sheet and the molten solder which is being formed by the melting of a strip of solder above it when a current is passed through it is prevented by it from flowing below it, wherein said mechanical device is adapted to guide its pair of electrodes towards said vertical metal sheet so that said electrically conducting wire can press a portion of solder on to said thin wire, wherein the driving mechanism for said mechanical device is adapted next to operate a time switch so as to pass the current from a supply of electricity for a predetermined period of time through a primary of an electrical transformer the secondary of which is electrically connected through an independent circuit to said pair of electrodes and wherein said driving mechanism is adapted thereafter to operate said mechanical device so that the electrodes with their electrically conducting wire between them are withdrawn from said vertical metal sheet.

Electrical soldering apparatus in accordance with another embodiment of the apparatus of the invention particularly adapted to solder in a continuous manner a bridge wire at the end of each successive tooth having two metal foil pole pieces between which is sandwiched a strip of non-conducting material of a comb produced by cutting an assembly formed by cementing two rectangular metallic sheets one on each side of a sheet of non-conducting material comprises in association means for feeding said combs, one at a time into position, means for placing each successive tooth of each comb into position, wire winding mechanism for winding a fine resistance wire vertically round a tooth, and electrical soldering means for soldering the fine resistance wire near the ends of the tooth to form a bridge wire at the end of each tooth which is adapted to operate two mechanical devices each carrying a pair of electrodes the free ends of each pair of which are substantially in the same horizontal plane and are connected by an electrically conducting wire of material to which molten solder does not adhere and of a length at least sufficient to permit a portion thereof to have a shape which conforms substantially to the configuration of the metal foil pole piece of a tooth in a horizontal plane and in the neighbourhood to which said fine resistance wire is to be soldered and at least such a length that when in a substantially horizontal plane and against a tooth the free ends of said electrodes are not in contact with said tooth and the molten solder which is being formed by the melting of a strip of solder above it when an electric current is passed through it is prevented by it from flowing below it, wherein each mechanical device is adapted to guide its pair of electrodes towards a tooth so that each of said electrically conducting wires can press a portion of solder on said fine resistance wire, wherein the driving mechanism for each mechanical device is adapted next to operate a time switch so as to pass a current from a supply of electricity for a predetermined period of time through each primary of a pair of electrical transformers each secondary of which is electrically connected through an independent circuit to one of said pairs of electrodes, and thereafter to operate said mechanical devices so that the electrodes with their electrical conducting wire between them are withdrawn.

Preferably mechanism is provided for feeding in synchronised association two strips of solder discontinuously from supplies thereof so that a fresh end portion is in front of each metal foil pole piece of a tooth subsequent to the winding of the fine resistance wire vertically round said tooth.

The invention is illustrated with reference to the diagrammatic drawings, Figures 1 to 9, attached hereto in which Figures 1 to 3 and 5 to 7 show successive stages in the soldering of a resistance bridge wire at the end of a tooth of a comb of teeth each having two metal foil pole pieces between which is sandwiched a strip of non-conducting material and at which end the metal foil pole pieces and part of the thickness of the non-conducting material at one side are removed to accommodate the required length of the resistance wire between the two metal foil pole pieces, in which Figure 4 is a plan view of two soldering bits each attached to its pair of electrodes and each pressing the portion of solder against the resistance wire on one metal foil pole piece, in which Figure 8 illustrates an embodiment of electrical soldering apparatus according to the invention particularly adapted to solder in a continuous manner a bridge wire at the end of each successive tooth as aforesaid of a comb of said teeth, and in which Figure 9 is an enlargement of that portion of Figure 8 showing the solder feed mechanism, the solder feed rollers, the knives, the soldering bits and the electrodes for the soldering bits.

In Figures 1 to 7 only one tooth of a comb is shown. This tooth has resistance bridge wire 1 wound lengthwise round it and consists of two sheets of brass 2 and a sheet of electrical insulating material 3 sandwiched between and cemented to the two brass sheets 2 so that the resistance bridge wire 1 forms a bridge at the end 4 of the tooth where the sheets of brass 2 and part of the thickness of the insulating material 3 are removed. The comb is held in clamps 5. 6 are knives, 7 are soldering bits according to the invention each of 22 S.W.G. tungsten wire of 14 mm. length bent so as to permit a length of 4 mm. to be presented to the tooth, 8 are pairs of electrodes for each soldering bit, 9 are flat ribbons of flux cored solder of 0.008 inch thickness produced by flattening flux cored solder of 22 S.W.G. and 10 are guides for the ribbons of flux cored solder 9.

In Figure 1 the flat ribbons of flux cored solder 9 are about to be fed downwards and the knives 6 and the soldering bits 7 are in a retracted position.

In Figure 2 the flat ribbons of flux cored solder 9 are in a position ready for soldering. The knives 6 and the soldering bits 7 are still in a retracted position.

In Figure 3 each soldering bit 7, one on each side of the tooth, is pressed against its respective ribbon of solder 9 and the knives 6 are in position ready to cut off the requisite lengths of solder.

Figure 4 is a plan view of the soldering bits 7 with their respective electodes 8 showing each soldering bit 7 pressed against its respective ribbon of solder 9.

In Figure 5 the required portions of the flat ribbons of flux cored solder 9 are cut off.

In Figure 6 the cut-off portions of the flat ribbons of flux cored solder 9 are shown as re-solidified beads of solder 11 which are formed after an electric current of about 150 amperes and 0.2 second duration is passed through each soldering bit 7 and after 0.5 second are allowed to elapse after the electric current has ceased.

Figure 7 shows a tooth of a comb having its resistance bridge wire 1 soldered in position.

Referring to Figures 8 and 9, 12 is a weight for the weight-controlled feeding device 13 for the combs 14 arranged with their teeth pointing upwards in the loading hopper 15 for directing these combs 14 into the comb guide 16 where they engage a feed sprocket 17 which carries the combs 14 to the first of a series of sprockets 18 for carrying the combs 14 intermittently tooth by tooth past the several operating stations to final delivery.

At the first operating station the bridge wire 19 is delivered from 20 which is free to turn on a disc 21 adapted to rotate around the comb guide 16 to permit the bridge wire 19 guided by a pulley 22 on the disc 21 to wind around each tooth of a comb as it passes the winding position.

At the second operating station predetermined quantities of flux cored flat ribbons of solder 23 are drawn intermittently from reels 24 by means of two pairs of pressure loaded feed rollers 25, 26, 26 being rubber covered, through guide slots 27 to the soldering position.

These predetermined portions of flux cored solder are then pressed into position against each side of a tooth by the soldering bits 28 fixed to the electrodes 29 which are carried on pivoted levers 30. Said predetermined portions of flux cored solder are then cut off by means of knives 31 when electric currents from the transformers 32 pass through lead wires 33 to the electrodes 29 and so through the soldering bits 28. The soldering bits 28 thus become heated and melt the cut-off portions of solder into beads. The duration of the electric current is controlled by a timing mechanism (not shown) working in synchronisation with the driving mechanism of the apparatus. The soldering bits 28 remain in contact with the molten beads thus formed until they solidify when the soldering bits 28 retract. The comb then moves forward.

The excess wire on each tooth is removed by means of brushes 34 on each side of the comb.

In the final operating station the finished combs 35 are ejected by the pusher bar 36 so that they fall teeth downwards into a hopper 37.

What we claim is:

1. A method of spot-soldering a thin wire to a metal sheet by means of a portion of solder comprising the steps of: disposing the metal sheet generally vertically; arranging the wire intermediate the solder and the metal sheet; and applying heat directly to the solder by a heating element to which the molten solder will not adhere, disposing said heating element adjacent the solder in such manner to provide a catchment for the solder to permit the solder to run down on to it and thereby limit the area, over which the solder will extend.

2. A method of soldering a thin wire to a metal sheet which comprises the steps of supporting the metal sheet and the thin wire vertically in contact with one another, feeding solder in strip form parallel to said metal sheet and thin wire, advancing the strip into close contact with said thin wire by pressure applied to said solder through a surface of an electrically conducting spot-soldering body, cutting off a desired length of the solder strip so that it extends slightly above and below said surface, passing an electric current through said body for a period of time sufficient to melt the solder above said surface as well as over the area of its contact between said body and said thin wire, discontinuing the current and after the solder has formed a bead above said area of contact and solidified, withdrawing said body, and the surface of said body consisting of material that does not adhere to the molten solder.

3. Electrical soldering apparatus adapted to solder a thin wire to a vertical metal sheet, which apparatus comprises a holder for holding a metal sheet in vertical position with a thin wire in contact with the sheet, movable electrode supporting means, a pair of electrodes carried by said means, an electrically conducting wire of material to which molten solder does not adhere connecting the free ends of the electrodes in said pair, at least a portion of said conducting wire being transverse to the vertical plane, means for moving said electrically conducting wire into and out of a soldering relationship with the metal sheet in said holder, solder feeding means for feeding solder into a position between said conducting wire and the thin wire.

4. The structure defined in claim 3 wherein the solder feeding means is synchronized with the conducting wire moving means and further comprising a timing mechanism for controlling the movement of said electrode supporting means and the passage of current through said electrically conducting wire.

5. Apparatus particularly adapted to solder in a continuous manner a bridge wire at the end of each successive tooth of a comb of the kind herein described, which comprises means for feeding said combs in a substantially linear direction, a thin resistance wire and wire winding means therefor for winding said wire spirally onto said combs with a pitch equal to one tooth pitch of said comb so that a length of said thin resistance wire lies across the apex of each tooth, said feeding means being operable to feed said combs intermittently and tooth-by-tooth to and through said winding means, and electrical soldering means positioned generally in the direction of movement of said combs and downstream from said winding means for soldering the thin resistance wire on both sides of the combs near the apex of each tooth to form a bridge wire across each tooth, said feeding means also being operable to present each tooth of said combs successively to said soldering means.

References Cited in the file of this patent

UNITED STATES PATENTS

| 1,816,115 | Helle | July 28, 1931 |
| 2,324,973 | Young | July 20, 1943 |
| 2,414,463 | Gunn et al. | Jan. 21, 1947 |
| 2,762,903 | Brimley | Sept. 11, 1956 |

FOREIGN PATENTS

| 830,390 | France | May 16, 1938 |